B. HASKELL.
FLEXIBLE CONDUIT OR COUPLING.
APPLICATION FILED SEPT. 8, 1915.
1,235,798.
Patented Aug. 7, 1917.
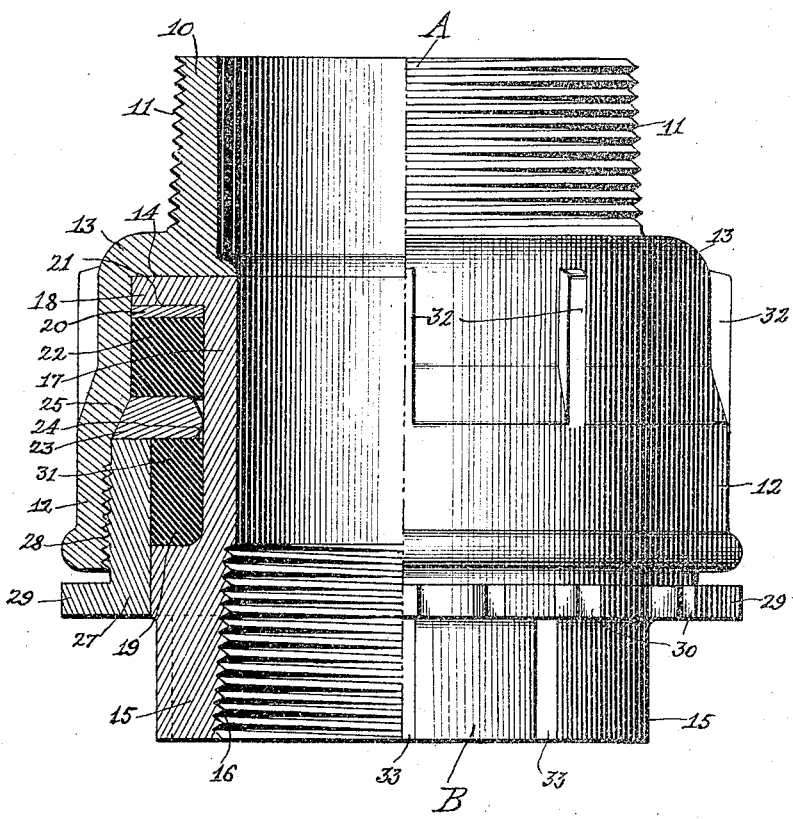
INVENTOR
Broderick Haskell.
BY
Attorney

UNITED STATES PATENT OFFICE.

BRODERICK HASKELL, OF FRANKLIN, PENNSYLVANIA.

FLEXIBLE CONDUIT OR COUPLING.

1,235,798.　　　　Specification of Letters Patent.　　Patented Aug. 7, 1917.

Application filed September 8, 1915. Serial No. 49,529.

*To all whom it may concern:*

Be it known that I, BRODERICK HASKELL, a citizen of the United States, residing at Franklin, in the county of Venango and State of Pennsylvania, have invented certain new and useful Improvements in Flexible Conduits or Couplings, of which the following is a specification.

This invention relates to couplings for conduits and more particularly to a flexible coupling in which the coupled members are free to be turned relatively to each other.

The objects and novel features of the invention will be apparent from the following description taken in connection with the drawing which is a view partly in central section and partly in side elevation illustrating a coupling embodying my invention.

Referring to the drawing, A and B designate the two members coupled together. The sleeve member A comprises a part 10 provided with exterior threads 11 for connecting it to a pipe. The sleeve member also has an enlarged portion 12 joined to the part 11 by a bend 13 which provides a shoulder 14 on the interior of the sleeve and an enlargement to receive the bushing B.

The bushing B consists of a part 15 provided with interior threads 16 to which a pipe may be connected. The bushing B has a part 17 of reduced exterior diameter disposed within the enlarged part 12 of the sleeve A. The part 17 of the bushing terminates at the inner end in an outwardly extending flange 18 which is designed to abut against the shoulder 14 on the sleeve A when the parts are assembled, and its outer diameter is slightly smaller than the interior diameter of the part 12 at that point to provide a close fit of the parts. At the point where the parts 15 and 17 join, there is a shoulder 19, for a purpose to be set forth.

The space between the part 17 of the bushing B and the enlargement 12 of the sleeve A contains packing for the swivel joint and the means for retaining the parts in proper relation to each other.

A gasket ring 20 fits against the inner face 21 of the flange 18 and a packing 22 is held in place against the ring 20 by a one-piece metal retaining ring 23 which surrounds and is loose on the part 17 of the bushing B. The retaining ring 23 is non-removable from the bushing B, since its terminal diameter is less than that of the flange 18 or of the shoulder 19. In order to provide such a ring 23 the part 17 of the bushing B is formed with an integral outer collar which is afterward cut free from the bushing at the point where it is united to the bushing, by cuts which produce the angular faces 24 at the inner edge of the ring.

The peripheral edge of the ring has a tapering surface to fit a corresponding tapering seat 25 on the inner wall of the part 12 of the sleeve A.

In order to connect the parts together and press the ring 23 to its seat 25 to hold the packing 22 in place, I provide a gland 27 which is in the form of a threaded, flanged, sleeve and fits into the space between the sleeve A and the bushing B. The gland 27 is threaded on its exterior to engage threads on the interior wall of the sleeve, as shown at 28. The gland also has a flange 29 provided with ribs 30 adapted to be engaged by a suitable tool to turn the gland to force it inwardly against the ring 23 to press the latter and the packing 22 behind it in place to secure the parts together.

The gland 27 surrounds the shoulder 19 on the bushing B and forms a chamber between the retaining ring 23 and shoulder 19 which is designed to receive a second rubber gasket or lubricated packing 31 against which the gland engages. The lubricated packing 31 is auxiliary to the packing 22 between the ring 23 and the flange 18. The solid ring 23 being carried by the bushing B between the packing members 22 and 31 is virtually a part of the bushing B for the reason that it is non-removable from said bushing and being forced against the seat 25 by the gland 27 practically becomes a part of the sleeve A, forming a rigid connection between the members A and B but permitting them to swivel with respect to one another.

Any leakage past the joint between the coupling members will be practically impossible. The parts 12 and 15 of the sleeve A and bushing B are provided with the ribs 32 and 33 respectively whereby they may be engaged by suitable wrenches to turn the members. By providing the enlargement on the sleeve A and fitting the bushing B into the same, the cross-sectional area of the conduit need not be restricted.

While I have shown and described the coupling in detail I do not wish to be limited to the exact construction as shown as it is obvious that certain details may be changed without departing from the spirit of the invention.

What I claim is:

1. In a coupling, the combination of a sleeve, having an inwardly inclined seat on its inner side, a bushing fitting in said sleeve, a packing ring between the sleeve and bushing, a retaining ring on the bushing, and a gland engaging the sleeve for holding the retaining ring in place against the packing ring and locked against the inclined seat of the sleeve.

2. In a flexible coupling, the combination of a sleeve, having an inner inclined seat, a bushing fitting in said sleeve and having a flange thereon, a non-removable retaining ring on said bushing, a packing member between said flange and ring, and a gland having threaded engagement with said sleeve and engaging and forcing the retaining ring against the packing and inclined seat whereby said packing member is held in place and the ring is locked to the sleeve.

3. In a flexible coupling, the combination of a sleeve, a bushing having a part fitting in said sleeve and spaced therefrom, packing rings between said sleeve and bushing, and a retaining ring non-removably secured to said bushing and interposed between said packing rings.

4. In a flexible coupling, the combination of a sleeve having a tapering seat on its interior wall, a bushing having a part fitting in said sleeve and spaced therefrom, a packing in the space between said sleeve and bushing, a retaining ring for said packing having a tapering face fitting said seat, and means whereby said ring is clamped to its seat to hold said packing in place and unite said sleeve and bushing.

5. In a flexible coupling, the combination of a sleeve having an interior shoulder, a bushing fitting in said sleeve and abutting against said shoulder, a packing between said sleeve and bushing, a non-removable ring on said bushing for retaining said packing in place, and a gland locking said sleeve and bushing together and adapted to exert pressure against said retaining ring and lock said ring against the shoulder of the sleeve.

6. In a flexible coupling, the combination of a sleeve having an enlarged portion provided with a tapering seat on its interior wall, a bushing having a part fitting in said enlarged portion of the sleeve, a packing in the space between said sleeve and bushing, a one-piece non-removable ring for retaining said packing in place, said ring having a peripheral edge fitting said tapering seat, and a clamping member for holding said ring to its seat and for connecting said bushing and sleeve.

7. In a flexible coupling, the combination of a sleeve, a bushing having a flange and a shoulder spaced apart, a ring on said bushing between said flange and shoulder, packing members on opposite sides of said ring, and a gland forcing said ring and one packing member toward said flange and fitting against the packing between said ring and shoulder.

8. In a coupling, the combination of a sleeve, a bushing having a part fitting in said sleeve and provided with an inner shoulder, a non-removable ring on the bushing in the space between the sleeve and bushing, a gland extending into the space between the sleeve and bushing, engaging and locking said ring against the shoulder of the sleeve and forming a closed annular chamber between said ring and shoulder, and packing in said annular chamber.

In testimony whereof I affix my signature in the presence of two witnesses.

BRODERICK HASKELL.

Witnesses:
WM. E. ROSS,
LEE H. WRIGHT.